United States Patent [19]
Adiletta et al.

[11] Patent Number: 6,160,809
[45] Date of Patent: Dec. 12, 2000

[54] DISTRIBUTED PACKET DATA WITH CENTRALIZED SNOOPING AND HEADER PROCESSING ROUTER

[75] Inventors: Matthew James Adiletta, Worcester; Gilbert Wolrich, Framingham; John Cyr, Boxborough, all of Mass.

[73] Assignee: Compaq Computer Corporation, Houston, Tex.

[21] Appl. No.: 08/992,453

[22] Filed: Dec. 17, 1997

[51] Int. Cl.[7] ................................................. H04L 12/54
[52] U.S. Cl. .......................................... 370/392; 370/402
[58] Field of Search ..................................... 370/392, 401, 370/402, 403, 404, 405, 390, 422, 423; 395/200; 709/221

[56] References Cited

U.S. PATENT DOCUMENTS

| | | | |
|---|---|---|---|
| 5,095,480 | 3/1992 | Fenner | 370/94.1 |
| 5,390,173 | 2/1995 | Spinney et al. | 370/60 |
| 5,483,640 | 1/1996 | Isfeld et al. | 395/200.03 |
| 5,649,100 | 7/1997 | Ertel et al. | 395/200.1 |
| 5,651,002 | 7/1997 | Van Seters et al. | 370/392 |
| 5,796,944 | 8/1998 | Hill et al. | 395/200.8 |
| 5,937,169 | 8/1999 | Connery et al. | 395/200.8 |
| 5,978,844 | 11/1999 | Tsuchiya et al. | 709/221 |

*Primary Examiner*—Chau Nguyen
*Assistant Examiner*—Chiho Andrew Lee
*Attorney, Agent, or Firm*—Hamilton, Brook, Smith & Reynolds, P.C.

[57] ABSTRACT

A packet processing system or router is disclosed that has at least one central packet-header processor, a packet broadcast bus, and local packet controllers that communicate with each other and the central packet-header processor via the packet broadcast bus. Packets received by media access controllers are passed to the associated local packet controllers and then broadcast on the packet broadcast bus. These broadcast packets are stored in packet buffer memories of the controllers, and the processor snoops for at least headers of the broadcast packets. The headers are analyzed and the processor issues forwarding instructions concerning the broadcast packets to the local packet controllers. As a result, the packet data only traverses the bus once. Only a relatively short forwarding decision is generated after the packets are broadcast and this can occur on a separate control bus, if desired. Thus, by employing centralized snooping for packet header processing coupled with distributed packet data at local controller, bus bandwidth is reduced by one-half over previous centralized configurations in which every packet traversed the bus at least twice.

14 Claims, 4 Drawing Sheets

DISTRIBUTED PACKET DATA WITH CENTRALIZED SNOOPING AND HEADER PROCESSING ROUTER

BACKGROUND OF THE INVENTION

Aside from typically less sophisticated devices such as repeaters, computer or data networking devices can be generally divided into two classes: bridges or switches and routers. Bridges or switches are layer-2 devices in the seven layer ISO (International Organization for Standardization) reference model of open system interconnection. Their principle role is to read the destination physical address of incoming packets, headers, determine how the packets must propagate through the bridge to reach their destination, i.e., a forwarding decision, and then retransmit the packets according to that forwarding decision. On the other hand, routers are layer-3 devices in which the forwarding decisions may also include the modification of the headers and specifically the destination addresses of the packets when necessary for the packets to reach their intended destinations, especially when the packets are transmitted between networks. Because of the different functionality that is required from routers on one hand and bridges/switches on the other hand, different architectures have been used to implement the networking devices.

One bridging architecture employs distributed data and distributed header processing. Local packet controllers share a common packet broadcast bus in a highly symmetric fashion, each controller having its own address look-up table (LUT). Packets received in through ports of the bridge are first passed to the local packet controller that controls the respective ports and then are distributed to the other controllers via the common broadcast bus. Each of the local packet controllers analyzes the packets on the broadcast bus to assess whether or not that packet must be sent out a port controlled by that controller by reference to the controller's address LUT and the packet's header. This relatively newer architecture contrasts against more conventional systems employing centralized data with centralized address look-up. In these systems, each received packet is be passed to a central packet processor that makes all of the forwarding decisions and then sends the packet to media access controllers (MAC) of the appropriate destination ports.

The typical router architecture is highly centralized, generally analogous to the conventional bridge architecture. It employs centralized header processing and centralized packet data storage. Packets received into the router via the ports are forwarded to a central header processor via a bus. The processor then decides how the packet should be forwarded, including whether its header must be modified. Once modified, if necessary, the packet is then forwarded to the appropriate MAC, again via the bus, for transmission out of the router either to its destination node or to another router.

SUMMARY OF THE INVENTION

With the every increasing traffic on data networks, there is always a need for routers with higher throughput, i.e., the ability to process more packets more quickly. One major limitation in the speed at which existing routers can process packets, however, is the bandwidth of the packet aggregating bus or the bus that connects the ports and the central header processor. The reason why existing architectures stress the bandwidth of this bus is because every packet processed by the router must traverse this bus at least twice, once when the packet is being transmitted from the port to the central header processor and a second time when the packet is passed by the central header processor back to the output port.

The present invention has the capability of reducing the congestion on the bus by approximately one-half over older router architectures. This is accomplished by employing centralized snooping for packet header processing coupled with distributed packet data at local controllers at the ports.

In general, according to one aspect, a packet processing system that has at least one central packet-header processor, a packet broadcast bus, and local packet controllers that communicate with each other and the central packet-header processor via the packet broadcast bus. Packets received by media access controllers are passed to the associated local packet controllers and then broadcast on the packet broadcast bus. These broadcast packets are stored in packet buffer memories of the controllers, and the packet-header processor snoops for at least headers of the broadcast packets. The headers are analyzed and the processor issues forwarding instructions concerning the broadcast packets to the local packet controllers. As a result, the packet data only traverses the bus once. Only a relatively short forwarding decision is generated after the packets are broadcast and this can occur on the broadcast bus or a separate control bus, if desired. Thus, bus bandwidth is reduced by one-half over previous centralized configurations.

According to details of the system, the forwarding instructions to the controller typically take a number of forms. The broadcast packets may be dismissed by a controller when that controller will not be forwarding the packets out of the packet processing system. Alternatively, the controller may be instructed to send the packets by passing the buffered packets to its media access controller for transmission out of the packet processing system. In this case, the controller may also be instructed to modify the packets prior to transmission.

In specific embodiments, the modify instruction includes immediate data comprising new header bits and an offset from the start of the packet.

In other embodiments, multiple central packet-header processors may be used in an interleaved manner to cooperatively generate forwarding instructions for packets broadcast on the bus.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

The foregoing and other objects, features and advantages of the invention will be apparent from the following more particular description of preferred embodiments and the drawings in which like reference characters refer to the same parts throughout the different views. The drawings are not necessarily to scale, emphasis instead being placed upon illustrating the principals of the invention.

DETAILED DESCRIPTION OF THE PREFERRED EMBODIMENTS

Figure 1:
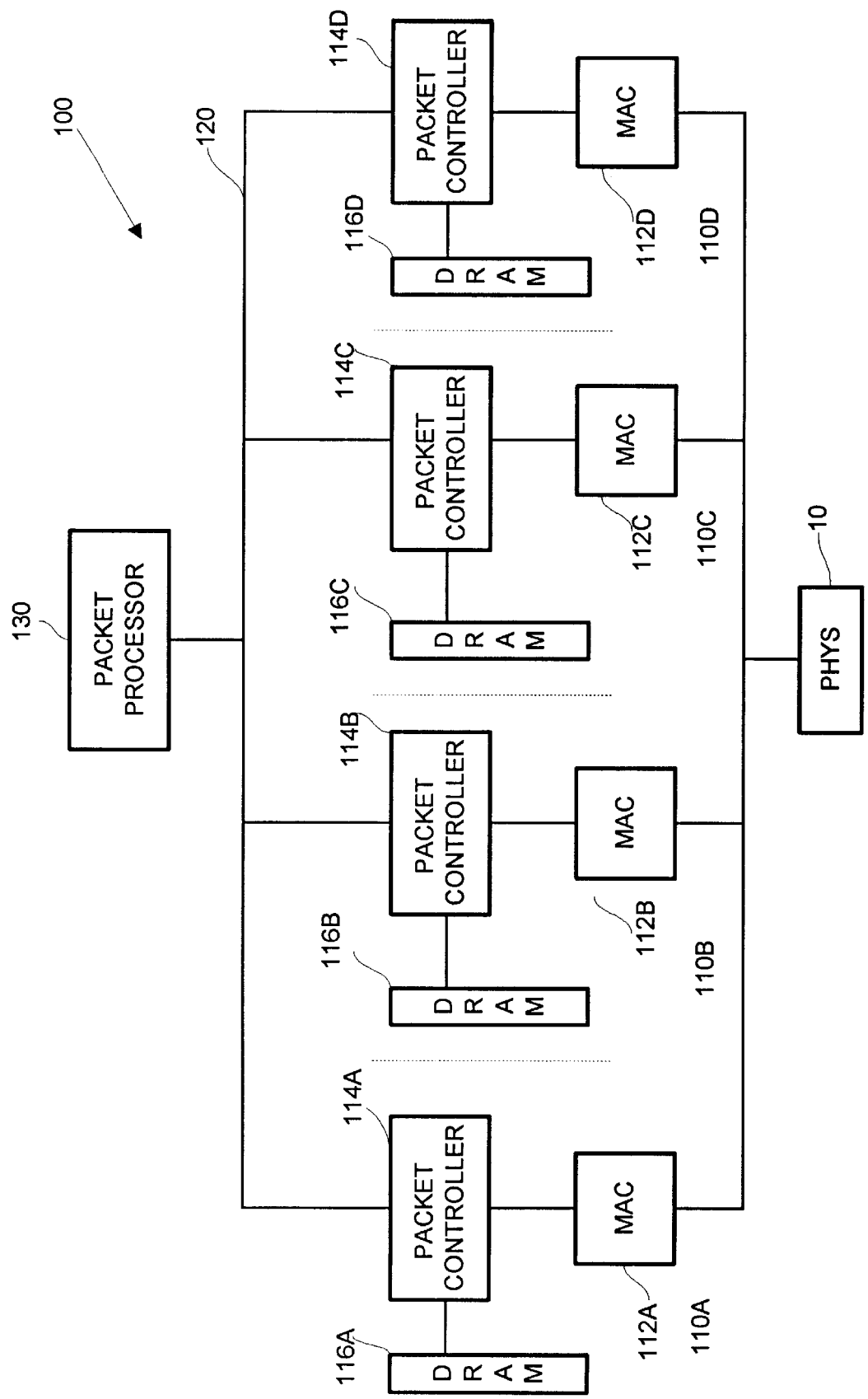
FIG. 1 is a block diagram of a centralized header processing with distributed packet data router according to the present invention.

FIG. 1 illustrates the architecture of a router 100 that has been constructed according to the principles of the present invention. Generally, the router 100 comprises separate sections 110A–110D that are interconnected to each other via a common bus or backplane 120 and to a central packet-header processor 130 for the router 100. Each of the separate sections 100A–100D may be implemented on separate cards or stacked units. Alternatively, they can be integrated with each other on a common board or substrate. Moreover, in the illustrated embodiment, four of these sections are shown. Depending in the application, more or less sections may be included as needed.

Each section 110A–110D has a media access controller 112. These devices support the interface between the router 100 and its ports to the physical data transmission media 10, which usually is an electrical or optical media. Each media access controller 112A–112D preferably supports multiple ports. For example, dual, quad, or octal 100Bt-type MACs may be used. In various embodiments, these ports may be to networks operating on different protocols such as token-ring, ATM (asynchronous transfer mode), and FDDI (fiber distributed data interface).

In any case, the MACs provide the proper interface to the networks of the physical media. They receive packets destined for the router 100 from their respective networks and transmit packets destined to be output by the router onto the networks using the appropriate protocols for the networks.

Each MAC 112 interfaces with a local packet controller 114 such that at least one packet controller 114A–114D is provided for each section 110A–110D of the router. The packet controllers 114A–114D function to buffer packet data in associated or corresponding local memories 116A–116D in each section. Each of these packet controllers 114A–114D communicates with the other controllers and the central header processor 130 via the bus 120. In embodiments, the local packet controllers are implemented as microprocessors or signal processors. In a preferred embodiment, they are application specific integrated circuits (ASIC) to maximize the speed of their operation.

Figure 2A:
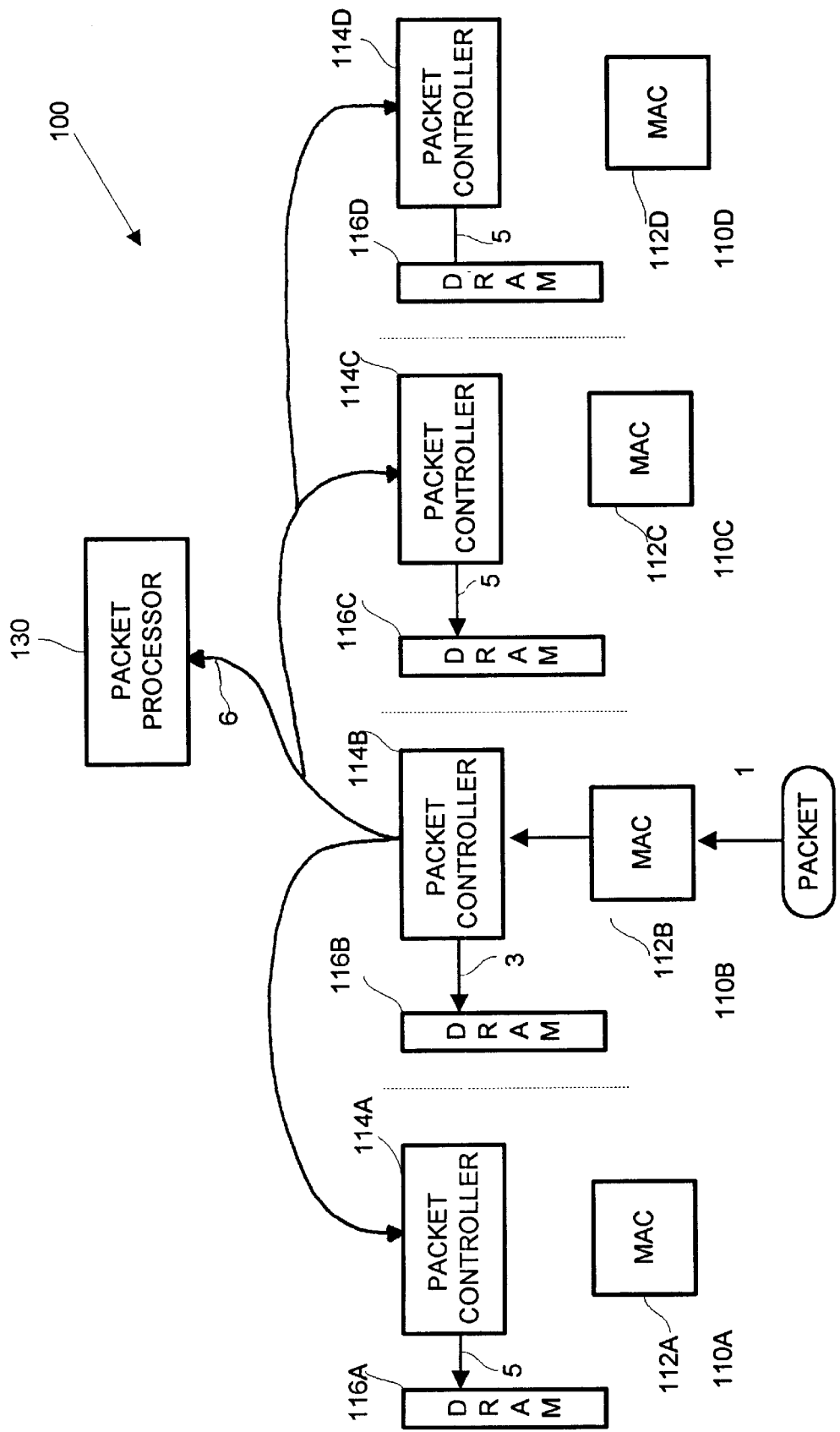
FIGS. 2A and 2B are architecture processing diagrams illustrating the operation of the router.

FIG. 2A illustrates the propagation of an incoming packet through the router. The exemplary packet is received at one of the MACs 112A–112D, 112B in the illustrated example. The packet is passed from the receiving MAC to its local packet controller 114B in step 2. The local packet controller 114B then buffers the packet in its local memory 116B in step 3. The packet, however, is also broadcast on the bus 120 by the local packet controller 114B in step 4. This allows each of the other local packet controllers 114A, 114C, 114D to also buffer this received packet in their respective local memories 116A, 116C, 116D in steps 5.

The buffering of the packet in every section 112A–112D of the router 100 occurs even if it is later determined that the packet is not required in those specific sections of the router. While in some sense inefficiently using the local memory 116 in the sections of the router that will not later need the packet, the packet only traverses the bus 120 once, reducing bus congestion.

As the packet is transmitted on the bus 120, the central packet-header processor 130 snoops at least for the packet's header in step 6 as it is broadcast on the bus 120 to the local controllers 114. The packet-header processor 130 then analyzes the packet's header and computes a forwarding decision by reference to an address look-up table or using an address resolution protocol, for example. If the packet is destined for another router and is not at its destination network, the header processor determines out of which port the packet should be transmitted to move it toward its destination. In short, the central header processor 130 determines whether the packet must be bridged, a layer-2 operation or routed a layer-3 operation.

One advantage of the router's architecture is that it reduces the need for memory bus bandwidth within the central processor. The processor 130 does not need to buffer every packet broadcast on the bus, only those packets' headers. Packet data buffering is instead performed by the local memories 116A–116D in each of the various sections 110A–110D.

Figure 2B:
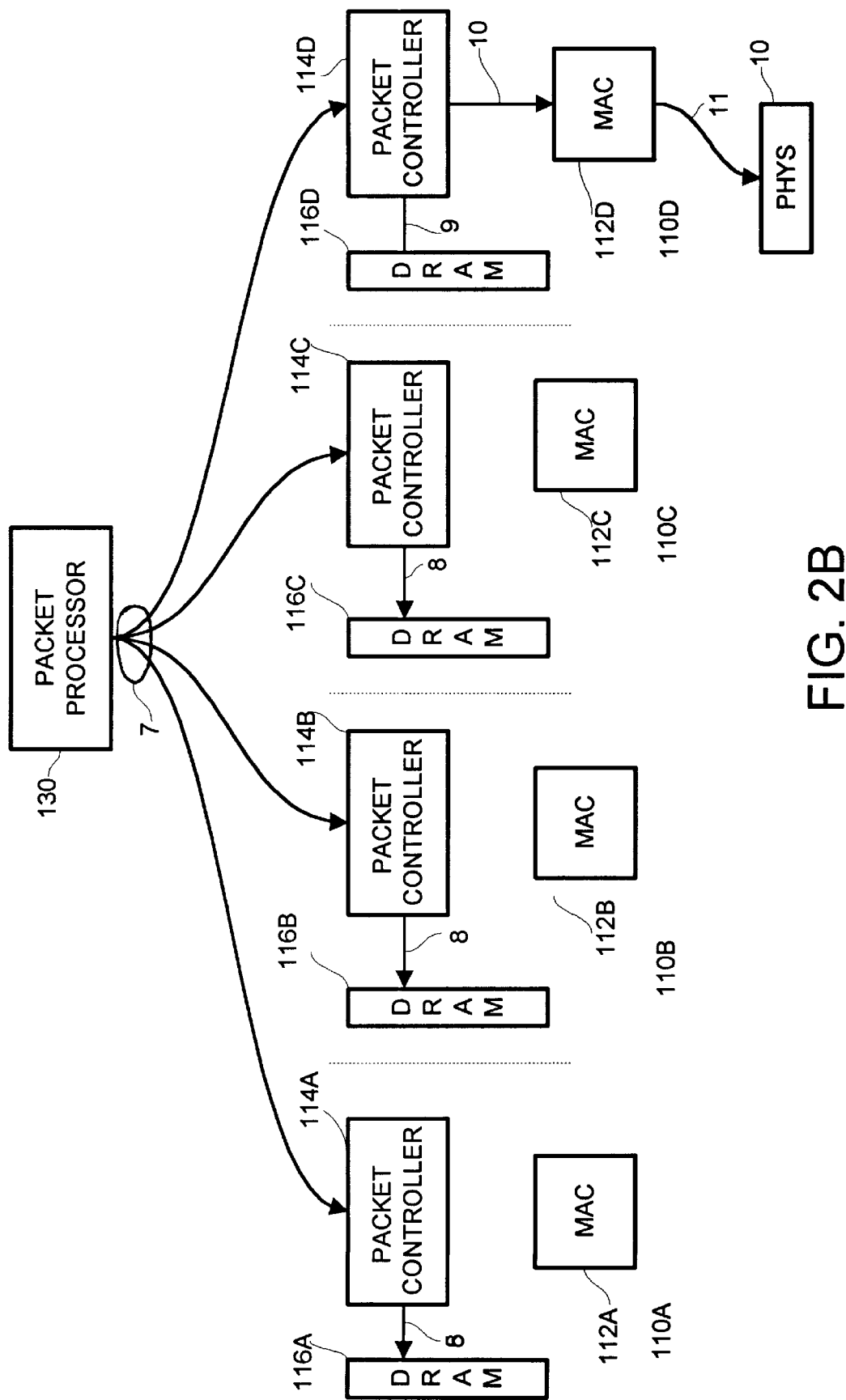

FIG. 2B shows the processing steps applied to forward the packet out of the router 100 to its destination. The forwarding decision including possibly a modified header for the packet is transmitted from the central header-processor 130 to the local controllers 114A–114D in step 7. This can occur over the packet bus or a parallel control bus between the central processor and the local controllers. This forwarding decision is usually individual for each packet controller 114A–114D to cause the local controllers to dismiss, modify, and/or send their respective copies of the packet, which have been buffered in their memories 116A–116D.

In a preferred embodiment, the central header processor instructs the local packet controllers in an a priori way by commands. It instructs the packet controllers to amend the packet header using immediate data and an off-set from the start of the packet.

According to the exemplary forwarding decision illustrated, packet controllers 114A–114C are instructed to dismiss their buffered versions of the packet. Accordingly controllers 114A–114C invalidate the packet's data in their respective memories 116A–116C, allowing it to be overwritten in steps 8. Local controller 114D, however, is instructed to modify and send its buffered packet. Accordingly, it reads the packet data from memory 116D in step 9 and make the instructed modification to the packet's header. After modification, the local controller 114D passes the packet to its associated MAC 112D in step 10 for transmission onto the physical media 10 in accordance with the appropriate protocol in step 11.

Another advantage of the illustrated architecture is that packet latency is reduced and bandwidth to the port is increased. When the forwarding decision is made, the packet need not be forwarded from the central processor's buffer memory to the port. It is already locally stored at the port or the section out of which it will be transmitted.

Figure 3:
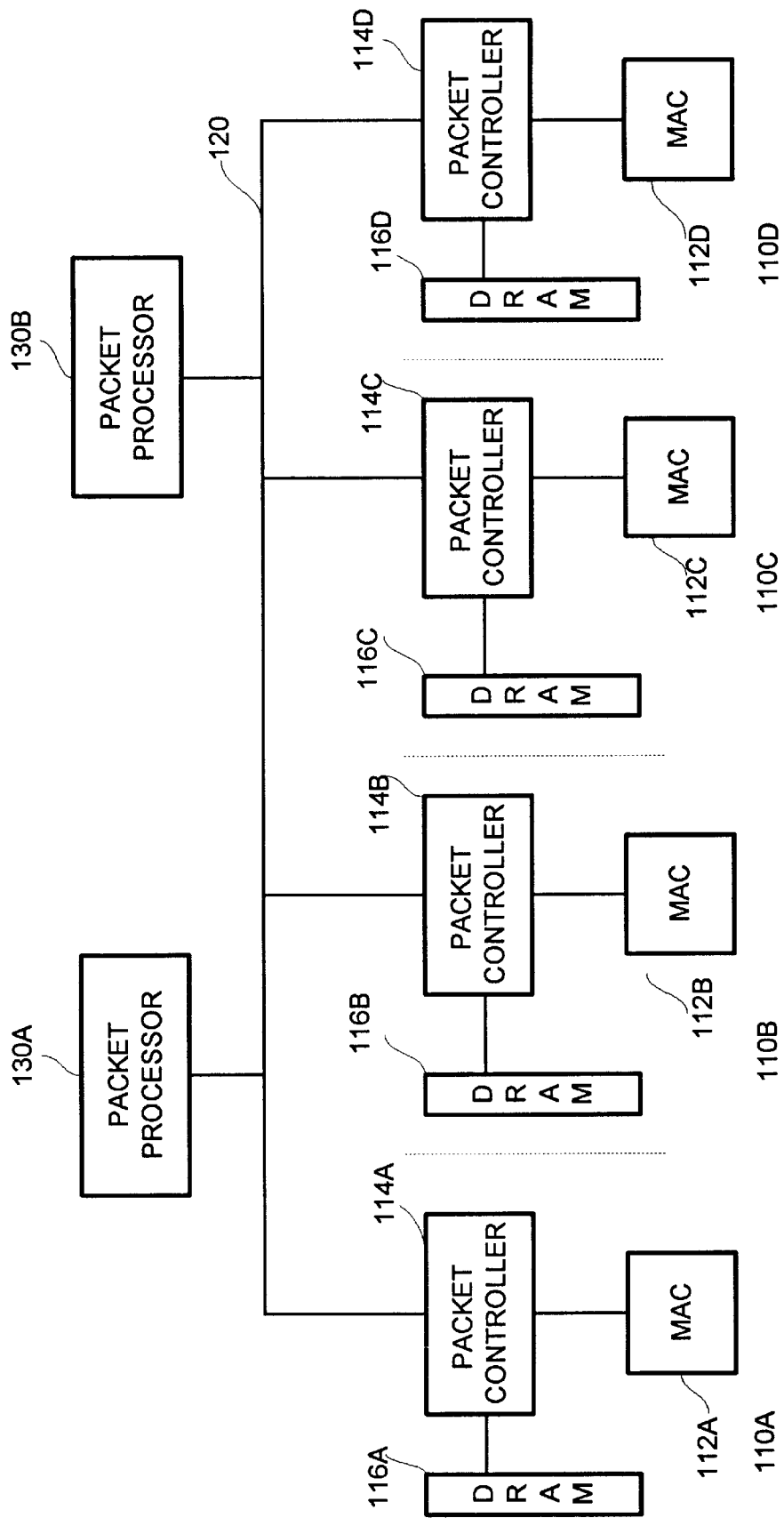
FIG. 3 is a block diagram of another embodiment of the inventive router.

FIG. 3 is a block diagram of a second embodiment of the present invention. This embodiment uses dual header processors 130A, 130B that utilize interleaved operation, in one implementation. These header processors support mirror address look-up tables and header processing algorithms to cooperatively provide forwarding decisions for the packets transmitted on the bus 120.

This second embodiment illustrates the speed advantages associated with the present invention. In the prior art, the packet must pass over the bus at least twice, first when it is passed to the central packet processor and the second time when it is passed from the central processor to the port. In the present invention, packet only traverses the bus once. In the case where the bus bandwidth is the criticality in throughput, the inventive router's throughput would be doubled. To support this doubling, multiple header processors are implemented to, for example, double the number of ports serviced by the router and the number of forwarding decisions that can be processed in a given span of time.

While this invention has been particularly shown and described with references to preferred embodiments thereof, it will be understood by those skilled in the art that various changes in form and detail may be made therein without departing from the spirit and scope of the invention as defined by the appended claims.

What is claimed is:

1. A packet processing system comprising:

at least one central packet-header processor;

a packet broadcast bus;

local packet controllers that communicate with each other and the at least one central packet-header processor via the packet broadcast bus;

a packet buffer memory associated with each local packet controller; and at least one media access controller associated with each local packet controller that sends and receives packets to and from ports of the packet processing system;

wherein packets received by the media access controllers are passed to the associated local packet controllers and then broadcast on the packet broadcast bus, the broadcast packets being stored in the packet buffer memories, and at least headers of the broadcast packets being processed by the central packet-header processor, which issues forwarding instructions concerning the broadcast packets to the local packet controllers.

2. A packet processing system as described in claim 1, wherein the central packet-header processor issues the forwarding instructions to dismiss broadcast packets that are stored in packet buffer memories of the local packet controllers that will not be forwarding the packets out of the packet processing system.

3. A packet processing system as described in claim 1, wherein the central packet-header processor issues the forwarding instructions instructing the local packet controllers whether to send the packets by passing the broadcast packets to the media access controllers for transmission out of the packet processing system.

4. A packet processing system as described in claim 1, wherein the central packet-header processor issues the forwarding instructions to modify the broadcast packets stored in at least one of the packet buffer memories prior to transmission out of the packet processing system.

5. A packet processing system as described in claim 4, wherein modify forwarding instructions from the central packet-header processor comprise new header data and an offset.

6. A packet processing system as described in claim 1, further comprising multiple central packet-header processors operating in an interleaved manner to cooperatively generate forwarding instructions for packets broadcast on the bus.

7. A method for processing packets in a router, comprising:

receiving packets at ports of the router with media access controllers;

passing the received packets from the media access controllers to local packet controllers, which are associated with each of the media access controllers;

broadcasting each of the received packets on a packet broadcast bus to the other local packet controllers, which store the broadcast packets in packet buffer memories;

snooping for at least headers of the broadcast packets with a central packet-header processor; and issuing forwarding instructions from the central packet-header processor concerning the broadcast packets to the local packet controllers.

8. A method as described in claim 7, further comprising the central packet-header processor issuing the forwarding instructions to dismiss broadcast packets that are stored in the packet buffer memories of the local packet controllers that will not be forwarding the packets out of the packet processing system.

9. A method as described in claim 7, wherein the step of broadcasting the packets results in multiple versions of the same packet being stored in each of the packet buffer memories.

10. A method as described in claim 7, further comprising the central packet-header processor issuing forwarding instructions instructing at least one of the local packet controllers to send the packets out of the packet processing system.

11. A method as described in claim 7, further comprising the central packet-header processor issuing forwarding instructions to modify the broadcast packets stored in at least one of the packet buffer memories prior to transmission out of the packet processing system.

12. A method as described in claim 11, further comprising the central packet-header processor issuing modify forwarding instructions comprising new header data and an offset.

13. A method as described in claim 7, further comprising snooping for the headers of the packets on the broadcast bus with at least two central packet-header processors.

14. A router comprising:

a central packet-header processor;

a packet broadcast bus;

multiple sections, each section comprising:

a local packet controller that communicates with local packet controllers in other sections and the central packet-header processor via the packet broadcast bus;

a packet buffer memory accessible by the local packet controller; and at least one media access controller controlled by the local packet controller that sends and receives packets to and from ports of the router;

wherein packets received by the media access controllers in the sections are passed to the local packet controllers and then broadcast on the packet broadcast bus to the local packet controllers in the other sections and stored in the packet buffer memories so that multiple versions of the same packet are stored in each of the sections, at least headers of the broadcast packets being processed by the central packet-header processor, which instructs each of the local packet controllers to modify, dismiss, and/or send the broadcast packets stored in the packet buffer memories.

* * * * *